United States Patent
DeHaan et al.

(10) Patent No.: US 9,201,485 B2
(45) Date of Patent: Dec. 1, 2015

(54) POWER MANAGEMENT IN MANAGED NETWORK HAVING HARDWARE BASED AND VIRTUAL RESOURCES

(75) Inventors: Michael Paul DeHaan, Morrisville, NC (US); James A. Laska, Cary, NC (US); William F. Peck, Douglas, MA (US)

(73) Assignee: Red Hat, Inc., Raleigh, NC (US)

( * ) Notice: Subject to any disclaimer, the term of this patent is extended or adjusted under 35 U.S.C. 154(b) by 1136 days.

(21) Appl. No.: 12/475,448

(22) Filed: May 29, 2009

(65) Prior Publication Data

US 2010/0306566 A1 Dec. 2, 2010

(51) Int. Cl.
| | |
|---|---|
| G06F 1/26 | (2006.01) |
| G06F 1/32 | (2006.01) |
| G06F 1/00 | (2006.01) |
| G06F 9/00 | (2006.01) |
| G06F 9/24 | (2006.01) |
| G06F 15/177 | (2006.01) |
| G06F 15/173 | (2006.01) |
| G06F 9/455 | (2006.01) |
| G06F 9/44 | (2006.01) |

(52) U.S. Cl.
CPC ............ *G06F 1/3203* (2013.01); *G06F 1/3234* (2013.01); *G06F 15/177* (2013.01); *G06F 1/26* (2013.01); *G06F 9/4401* (2013.01); *G06F 9/4418* (2013.01); *G06F 9/45533* (2013.01)

(58) Field of Classification Search
CPC ....... G06F 1/3234; G06F 1/26; G06F 9/4401; G06F 15/177; G06F 9/4418; G06F 9/45533
USPC .......... 713/330, 1, 2, 300, 320, 323; 709/220, 709/222, 223
See application file for complete search history.

(56) References Cited

U.S. PATENT DOCUMENTS

| | | | |
|---|---|---|---|
| 6,463,457 | B1 | 10/2002 | Armentrout et al. |
| 7,313,796 | B2 | 12/2007 | Hamilton et al. |
| 7,439,937 | B2 | 10/2008 | Ben-Shachar et al. |
| 7,529,785 | B1 | 5/2009 | Spertus et al. |
| 7,546,462 | B2 | 6/2009 | Upton |
| 7,596,620 | B1 | 9/2009 | Colton et al. |
| 2001/0039497 | A1 | 11/2001 | Hubbard |
| 2002/0069276 | A1 | 6/2002 | Hino et al. |

(Continued)

OTHER PUBLICATIONS

Morgan, "Systems and Methods for Generating Optimized Resource Consumption Periods for Multiple Users on Combined Basis", U.S. Appl. No. 13/037,359, filed Mar. 1, 2011.

(Continued)

*Primary Examiner* — Ji H Bae
(74) *Attorney, Agent, or Firm* — Lowenstein Sandler LLP

(57) ABSTRACT

Embodiments relate to systems and methods for power management in a managed network having hardware-based and virtual resources. A network management platform can host a power management engine to configure and manage the power operations of a mixed set of hardware-implemented and virtual machines. The virtual machines can be instantiated, for instance, via a mainframe platform and/or a cloud computing environment. The power management engine can maintain a power management settings indicating power management rules or preferences for the managed network. The power management settings can contain rules or commands, for instance, to sequence the power-on or power-off order between different hardware-implemented or virtual machines, based for instance on dependency orders or predetermined schedules.

15 Claims, 4 Drawing Sheets

(56) References Cited

U.S. PATENT DOCUMENTS

| | | | |
|---|---|---|---|
| 2002/0165819 A1 | 11/2002 | McKnight et al. | |
| 2003/0037258 A1 | 2/2003 | Koren | |
| 2003/0110252 A1 | 6/2003 | Yang-Huffman | |
| 2003/0135609 A1 | 7/2003 | Carlson et al. | |
| 2004/0162902 A1 | 8/2004 | Davis | |
| 2004/0210591 A1 | 10/2004 | Hirschfeld et al. | |
| 2004/0210627 A1 | 10/2004 | Kroening | |
| 2004/0268347 A1 | 12/2004 | Knauerhase et al. | |
| 2005/0131898 A1 | 6/2005 | Fatula | |
| 2005/0144060 A1 | 6/2005 | Chen et al. | |
| 2005/0182727 A1 | 8/2005 | Robert et al. | |
| 2005/0289540 A1 | 12/2005 | Nguyen et al. | |
| 2006/0075042 A1 | 4/2006 | Wang et al. | |
| 2006/0085530 A1 | 4/2006 | Garrett | |
| 2006/0085824 A1 | 4/2006 | Bruck et al. | |
| 2006/0130144 A1 | 6/2006 | Wernicke | |
| 2006/0177058 A1 | 8/2006 | Sarwono et al. | |
| 2006/0224436 A1 | 10/2006 | Matsumoto et al. | |
| 2007/0011291 A1 | 1/2007 | Mi et al. | |
| 2007/0028001 A1 | 2/2007 | Phillips et al. | |
| 2007/0226715 A1 | 9/2007 | Kimura et al. | |
| 2007/0283282 A1 | 12/2007 | Bonfiglio et al. | |
| 2007/0294676 A1 | 12/2007 | Mellor et al. | |
| 2008/0080396 A1 | 4/2008 | Meijer et al. | |
| 2008/0080718 A1 | 4/2008 | Meijer et al. | |
| 2008/0082538 A1 | 4/2008 | Meijer et al. | |
| 2008/0082601 A1 | 4/2008 | Meijer et al. | |
| 2008/0083025 A1 | 4/2008 | Meijer et al. | |
| 2008/0083040 A1 | 4/2008 | Dani et al. | |
| 2008/0086727 A1 | 4/2008 | Lam et al. | |
| 2008/0089338 A1* | 4/2008 | Campbell et al. | 370/392 |
| 2008/0091613 A1 | 4/2008 | Gates et al. | |
| 2008/0104608 A1 | 5/2008 | Hyser et al. | |
| 2008/0215796 A1 | 9/2008 | Lam et al. | |
| 2008/0240150 A1 | 10/2008 | Dias et al. | |
| 2009/0012885 A1 | 1/2009 | Cahn | |
| 2009/0025006 A1 | 1/2009 | Waldspurger | |
| 2009/0037496 A1 | 2/2009 | Chong et al. | |
| 2009/0089078 A1 | 4/2009 | Bursey | |
| 2009/0099940 A1 | 4/2009 | Frederick et al. | |
| 2009/0132695 A1 | 5/2009 | Surtani et al. | |
| 2009/0177514 A1 | 7/2009 | Hudis et al. | |
| 2009/0210527 A1 | 8/2009 | Kawato | |
| 2009/0210875 A1 | 8/2009 | Bolles et al. | |
| 2009/0217267 A1 | 8/2009 | Gebhart et al. | |
| 2009/0222496 A1* | 9/2009 | Liu et al. | 707/204 |
| 2009/0222805 A1 | 9/2009 | Faus et al. | |
| 2009/0228950 A1 | 9/2009 | Reed et al. | |
| 2009/0248693 A1 | 10/2009 | Sagar et al. | |
| 2009/0249287 A1 | 10/2009 | Patrick | |
| 2009/0249354 A1* | 10/2009 | Yamaguchi et al. | 718/106 |
| 2009/0260007 A1 | 10/2009 | Beaty et al. | |
| 2009/0265707 A1 | 10/2009 | Goodman et al. | |
| 2009/0271324 A1 | 10/2009 | Jandhyala et al. | |
| 2009/0276771 A1 | 11/2009 | Nickolov et al. | |
| 2009/0287691 A1 | 11/2009 | Sundaresan et al. | |
| 2009/0293056 A1 | 11/2009 | Ferris | |
| 2009/0299905 A1 | 12/2009 | Mestha et al. | |
| 2009/0299920 A1 | 12/2009 | Ferris et al. | |
| 2009/0300057 A1 | 12/2009 | Friedman | |
| 2009/0300149 A1 | 12/2009 | Ferris et al. | |
| 2009/0300151 A1 | 12/2009 | Friedman et al. | |
| 2009/0300152 A1 | 12/2009 | Ferris | |
| 2009/0300169 A1 | 12/2009 | Sagar et al. | |
| 2009/0300210 A1 | 12/2009 | Ferris | |
| 2009/0300423 A1 | 12/2009 | Ferris | |
| 2009/0300607 A1 | 12/2009 | Ferris et al. | |
| 2009/0300608 A1 | 12/2009 | Ferris | |
| 2009/0300635 A1 | 12/2009 | Ferris | |
| 2009/0300641 A1 | 12/2009 | Friedman et al. | |
| 2009/0300719 A1 | 12/2009 | Ferris | |
| 2010/0042720 A1 | 2/2010 | Stienhans et al. | |
| 2010/0050172 A1 | 2/2010 | Ferris | |
| 2010/0057831 A1 | 3/2010 | Williamson | |
| 2010/0058347 A1 | 3/2010 | Smith et al. | |
| 2010/0131324 A1 | 5/2010 | Ferris | |
| 2010/0131590 A1 | 5/2010 | Coleman et al. | |
| 2010/0131624 A1 | 5/2010 | Ferris | |
| 2010/0131649 A1 | 5/2010 | Ferris | |
| 2010/0131948 A1 | 5/2010 | Ferris | |
| 2010/0131949 A1 | 5/2010 | Ferris | |
| 2010/0132016 A1 | 5/2010 | Ferris | |
| 2010/0169477 A1 | 7/2010 | Stienhans et al. | |
| 2010/0220622 A1 | 9/2010 | Wei | |
| 2010/0299366 A1 | 11/2010 | Stienhans et al. | |
| 2010/0306599 A1* | 12/2010 | Cota-Robles et al. | 714/48 |
| 2011/0016214 A1 | 1/2011 | Jackson | |
| 2011/0022812 A1* | 1/2011 | van der Linden et al. | 711/163 |
| 2011/0131335 A1 | 6/2011 | Spaltro et al. | |

OTHER PUBLICATIONS

Morgan, "Systems and Methods for Metering Cloud Resource Consumption Using Multiple Hierarchical Subscription Periods", U.S. Appl. No. 13/037,360, filed Mar. 1, 2011.

Morgan, "Systems and Methods for Generating Marketplace Brokerage Exchange of Excess Subscribed Resources Using Dynamic Subscription Periods", U.S. Appl. No. 13/037,351, filed Feb. 28, 2011.

Ferris, et al., "Systems and Methods for Cominatorial Optimization of Multiple Resources Across a Set of Cloud-Based Networks", U.S. Appl. No. 12/953,718, filed Nov. 24, 2010.

Ferris et al., "Systems and Methods for Matching a Usage History to a New Cloud", U.S. Appl. No. 12/953,757, filed Nov. 24, 2010.

Ferris et al., "Systems and Methods for Identifying Usage Histories for Producing Optimized Cloud Utilization", U.S. Appl. No. 12/952,930, filed Nov. 23, 2010.

Ferris et al., "Systems and Methods for Identifying Service Dependencies in a Cloud Deployment", U.S. Appl. No. 12/952,857, filed Nov. 23, 2010.

Ferris et al., "Systems and Methods for Migrating Subscribed Services in a Cloud Deployment", U.S. Appl. No. 12/955,277, filed Nov. 29, 2010.

Ferris et al., "Systems and Methods for Migrating Subscribed Services from a Set of Clouds to a Second Set of Clouds", U.S. Appl. No. 12/957,281, filed Nov. 30, 2010.

Morgan, "Systems and Methods for Generating Multi-Cloud Incremental Billing Capture and Administration", U.S. Appl. No. 12/954,323, filed Nov. 24, 2010.

Morgan, "Systems and Methods for Aggregating Marginal Subscription Offsets in a Set of Multiple Host Clouds", U.S. Appl. No. 12/954,400, filed Nov. 24, 2010.

Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.

Morgan, "Systems and Methods for Managing Subscribed Resource Limits in Cloud Network Using Variable or Instantaneous Consumption Tracking Periods", U.S. Appl. No. 12/954,352, filed Nov. 24, 2010.

Ferris et al., "Systems and Methods for Migrating Software Modules into One or More Clouds", U.S. Appl. No. 12/952,701, filed Nov. 23, 2010.

Ferris et al., "Systems and Methods for Brokering Optimized Resource Supply Costs in Host Cloud-Based Network Using Predictive Workloads", U.S. Appl. No. 12/957,274, filed Nov. 30, 2010.

Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.

Morgan, "Systems and Methods for Detecting Resource Consumption Events Over Sliding Intervals in Cloud-Based Network", U.S. Appl. No. 13/149,235, filed May 31, 2011.

Morgan, "Systems and Methods for Triggering Workload Movement Based on Policy Stack Having Multiple Selectable Inputs", U.S. Appl. No. 13/149,418, filed May 31, 2011.

Morgan, "Systems and Methods for Cloud Deployment Engine for Selective Workload Migration or Federation Based on Workload Conditions", U.S. Appl. No. 13/117,937, filed May 27, 2011.

(56) References Cited

OTHER PUBLICATIONS

Morgan, "Systems and Methods for Tracking Cloud Installation Information Using Cloud-Aware Kernel of Operating System", U.S. Appl. No. 13/149,750, filed May 31, 2011.
Morgan, "Systems and Methods for Introspective Application Reporting to Facilitate Virtual Machine Movement Between Cloud Hosts", U.S. Appl. No. 13/118,009, filed May 27, 2011.
Morgan, "Systems and Methods for Self-Moving Operating System Installation in Cloud-Based Network", U.S. Appl. No. 13/149,877, filed May 31, 2011.
"rBuilder and the rPath Appliance Platform", 2007 rPath, Inc., www.rpath.com, 3 pages.
White Paper—"rPath Versus Other Software Appliance Approaches", Mar. 2008, rPath, Inc., www.rpath.com, 9 pages.
White Paper—"Best Practices for Building Virtual Appliances", 2008 rPath, Inc., www.rpath.com, 6 pages.
DeHaan et al., "Methods and Systems for Flexible Cloud Management with Power Management Support", U.S. Appl. No. 12/473,987, filed May 28, 2009.
Ferris, "Methods and Systems for Providing a Market for User-Controlled Resources to be Provided to a Cloud Computing Environment", U.S. Appl. No. 12/390,617, filed Feb. 23, 2009.
Ferris, "Methods and Systems for Communicating with Third Party Resources in a Cloud Computing Environment", U.S. Appl. No. 12/390,598, filed Feb. 23, 2009.
Ferris, "Systems and Methods for Extending Security Platforms to Cloud-Based Networks", U.S. Appl. No. 12/391,802, filed Feb. 24, 2009.
DeHaan et al., "Methods and Systems for Flexible Cloud Management", U.S. Appl. No. 12/473,041, fled May 27, 2009.
Ferris et al., "Systems and Methods for Aggregate Monitoring of Utilization Data for Vendor Products In Cloud Networks", U.S. Appl. No. 12/790,039, filed May 28, 2010.
Ferris, "Methods and Systems for Providing a Universal Marketplace for Resources for Delivery to a Cloud Computing Environment", U.S. Appl. No. 12/475,228, filed May 29, 2009.
DeHaan, "Methods and Systems for Abstracting Cloud Management", U.S. Appl. No. 12/474,113, filed May 28, 2009.
DeHaan, "Methods and Systems for Automated Scaling of Cloud Computing Systems", U.S. Appl. No. 12/474,707, filed May 29, 2009.
DeHaan, "Methods and Systems for Securely Terminating Processes in a Cloud Computing Environment", U.S. Appl. No. 12/550,157, filed Aug. 28, 2009.
DeHaan et al., "Methods and Systems for Flexible Cloud Management Including External Clouds", U.S. Appl. No. 12/551,506, filed Aug. 31, 2009.
DeHaan, "Methods and Systems for Abstracting Cloud Management to Allow Communication Between Independently Controlled Clouds", U.S. Appl. No. 12/551,096, filed Aug. 31, 2009.
DeHaan, "Methods and Systems for Automated Migration of Cloud Processes to External Clouds", U.S. Appl. No. 12/551,459, filed Aug. 31, 2009.
Ferris et al., "Methods and Systems for Pricing Software Infrastructure for a Cloud Computing Environment", U.S. Appl. No. 12/551,517, filed Aug. 31, 2009.
Ferns et al., "Methods and Systems for Metering Software Infrastructure in a Cloud Computing Environment", U.S. Appl. No. 12/551,514, filed Aug. 31, 2009.
DeHaan et al., "Systems and Methods for Secure Distributed Storage", U.S. Appl. No. 12/610,081, filed Oct. 30, 2009.
Ferris et al., "Methods and Systems for Monitoring Cloud Computing Environments", U.S. Appl. No. 12/627,764, filed Nov. 30, 2009.
Ferris et al., "Methods and Systems for Detecting Events in Cloud Computing Environments and Performing Actions Upon Occurrence of the Events", U.S. Appl. No. 12/627,646, filed Nov. 30, 2009.
Ferris et al., "Methods and Systems for Verifying Software License Compliance in Cloud Computing Environments", U.S. Appl. No. 12/627,643, filed Nov. 30, 2009.
Ferris et al., "Systems and Methods for Service Aggregation Using Graduated Service Levels in a Cloud Network", U.S. Appl. No. 12/628,112, filed Nov. 30, 2009.
Ferris et aL, "Methods and Systems for Generating a Software License Knowledge Base for Verifying Software License Compliance in Cloud Computing Environments", U.S. Appl. No. 12/628,156, filed Nov. 30, 2009.
Ferris et al., "Methods and Systems for Converting Standard Software Licenses for Use in Cloud Computing Environments", U.S. Appl. No. 12/714,099, filed Feb. 26, 2010.
Ferris et al., "Systems and Methods for Managing a Software Subscription in a Cloud Network", U.S. Appl. No. 12/714,096, filed Feb. 26, 2010.
Ferris et al., "Methods and Systems for Providing Deployment Architectures in Cloud Computing Environments", U.S. Appl. No. 12/714,427, filed Feb. 26, 2010.
Ferris et al., "Methods and Systems for Matching Resource Requests with Cloud Computing Environments", U.S. Appl. No. 12/714,113, filed Feb. 26, 2010.
Ferris et al., "Systems and Methods for Generating Cross-Cloud Computing Appliances", U.S. Appl. No. 12/714,315, filed Feb. 26, 2010.
Ferris et al., "Systems and Methods for Cloud-Based Brokerage Exchange of Software Entitlements", U.S. Appl. No. 12/714,302, filed Feb. 26, 2010.
Ferris et al., "Methods and Systems for Offering Additional License Terms During Conversion of Standard Software Licenses for Use in Cloud Computing Environments", U.S. Appl. No. 12/714,065, filed Feb. 26, 2010.
Ferris et al., "Systems and Methods for or a Usage Manager for Cross-Cloud Appliances", U.S. Appl. No. 12/714,334, filed Feb. 26, 2010.
Ferris et al., "Systems and Methods for Delivery of User-Controlled Resources in Cloud Environments Via a Resource Specification Language Wrapper", U.S. Appl. No. 12/790,294, filed May 28, 2010.
Ferris et al., "Systems and Methods for Managing Multi-Level Service Level Agreements in Cloud-Based Networks", U.S. Appl. No. 12/789,660, filed May 28, 2010.
Ferris et al., "Methods and Systems for Generating Cross-Mapping of Vendor Software in a Cloud Computing Environment", U.S. Appl. No. 12/790,527, filed May 28, 2010.
Ferris et al., "Methods and Systems for Cloud Deployment Analysis Featuring Relative Cloud Resource Importance", U.S. Appl. No. 12/790,366, filed May 28, 2010.
Ferris et al., "Systems and Methods for Generating Customized Build Options for Cloud Deployment Matching Usage Profile Against Cloud Infrastructure Options", U.S. Appl. No. 12/789,701, filed May 28, 2010.
Ferns at al., "Systems and Methods for Exporting Usage History Data as Input to a Management Platform of a Target Cloud-Based Network", U.S. Appl. No. 12/790,415, filed May 28, 2010.
Ferris at al., "Systems and Methods for Cross-Cloud Vendor Mapping Service in Cloud NetWorks", U.S. Appl. No. 12/790,162, filed May 28, 2010.
Ferris et al., "Systems and Methods for Cross-Cloud Vendor Mapping Service in a Dynamic Cloud Marketplace", U.S. Appl. No. 12/790,229, filed May 28, 2010.

* cited by examiner

POWER MANAGEMENT IN MANAGED NETWORK HAVING HARDWARE BASED AND VIRTUAL RESOURCES

FIELD

The present teachings relate to systems and methods for power management in a managed network having hardware-based and virtual resources, and more particularly to platforms and techniques for managing the power consumption patterns of a network having both installed hardware machines and mainframe-based or other virtual machines.

BACKGROUND OF RELATED ART

In the network management field, a number of platforms and tools exist to allow a systems administrator to manage the configuration and operation of a managed network, generally including servers, hosts, clients, targets, databases, and/or other devices or resources. In some cases, a managed network can contain a mix of both hardware-installed machines and a set of virtual machines, managed via one network management platform or other tool.

Network power consumption is one feature of operation that network management platforms have evolved to monitor and manage. Some network management platforms can receive power usage data as part of the collection of operating parameters used to monitor, configure, and optimize the operation of the network under management. Network management tools do not, however, today allow the integration of power management options in the case where the managed network contains not just hardware-installed or hardware-implemented machines, but also virtual machines whose power consumption footprint may be different than the power usage b hardware devices. It may be desirable to provide methods and systems capable of managing not just installed hardware resources, but also virtual machines or other resources incorporated in a managed network environment.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for power management in a managed network having hardware-based and virtual resources. More particularly, embodiments relate to platforms and techniques for integrating the management of mainframe-based, cloud-based, and/or other virtual machines or resources in the power management scheme for a managed network. According to embodiments in one regard, a network management platform can incorporate a power management engine which communicates with the hardware-installed resources of the managed network, as well as the mainframe or other host of the set of virtual machines populating the managed network. The power management engine can, in various regards, control the power-on, power-off, power-cycling, and other power management operations of resources under its control. In these regards, it may be noted that different types of hardware can require multiple stages for powering on, powering off, or undergoing other power operations. For instance, certain clients or other machines may initiate a power-on sequence, then require or accept a wake-on-local area network (LAN) signal, or insert a delay period, before actually turning that device on. The power management engine can in one regard permit a consistent management interface or protocol for various assets in a managed network, including hardware-based and virtual machines, regardless of power-on, power-off, or other power cycling sequences. According to embodiments, any of a range of systems can therefore have their power operations controlled via connection to a remote power management engine, including managed virtual systems, z/VM™ guests operating under mainframe control, or other fencing agents such as, for example, DRAC™ iLo™, Bladecenter™ or others. These and other embodiments described herein provide a network administrator with an ability to integrate a set of virtual mainframe-based machines, cloud-based machines, and/or other resources into a managed network environment having power management capabilities.

Reference will now be made in detail to exemplary embodiments of the present teachings, which are illustrated in the accompanying drawings. Where possible the same reference numbers will be used throughout the drawings to refer to the same or like parts.

Figure 1:
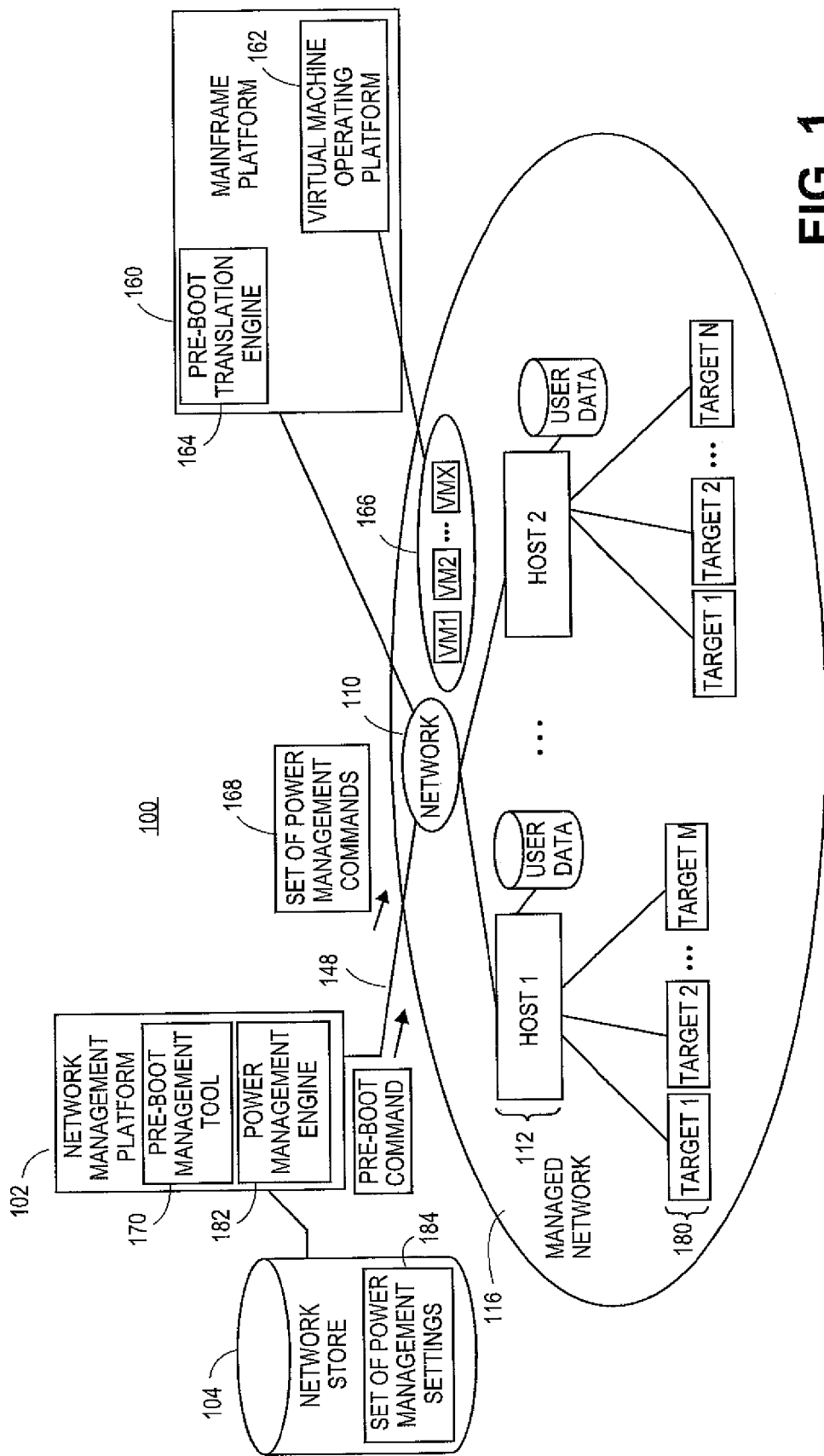
FIG. 1 illustrates an overall network in which systems and methods for power management in a managed network having hardware-based and virtual resources can be implemented, according to various embodiments of the present teachings.

FIG. 1 illustrates an overall system 100 in which systems and methods for power management in a managed network having hardware-based and virtual resources can be implemented, according to various embodiments of the present teachings. In embodiments as shown, network management platform 102 can communicate with managed network 116 via a secure channel 148. Secure channel 148 can for instance be or include the secure channel and related resources described in co-pending U.S. application Ser. No. 12/130,424, filed May 30, 2008, entitled "Systems and Methods for Remote Management of Networked Systems Using Secure Modular Platform," which published as U.S. patent application Publication No. 2010/0306566, assigned or under obligation of assignment to the same entity as this application, and which application is incorporated by reference herein. Secure channel 148 can be or include, for example, a secure socket layer (SSL) connection, a channel established using a public/private key infrastructure, and/or other connections, channels, or protocols. Managed network 116 can include, as shown, a set of hosts 112, a set of targets 180, and/or other machines, devices, clients, and/or other hardware, software, storage or other resources.

While secure channel 148 is illustratively shown as one channel to managed network 116 or devices therein, it will be understood that in embodiments, secure channel 148 can comprise multiple channels or connections. In embodiments, secure channel 148 can be replaced by a non-secure channel or connection. In general, network management platform 102 can communicate with the managed network 116 and its constituent machines and resources, which can for instance comprise personal computers, servers, network-enabled devices, virtual machines, and/or other devices, and manage the security of those machines under the supervision of network management platform 102.

The network management platform 102 can host a set of engines, logic, and/or other resources to interrogate managed network 116 and manage the servers, hosts, clients, targets, services, and/or other resources of managed network 116. Network management platform 102 can communicate with associated network store 104 to store network-related management data. In embodiments, managed network 116 can comprise a set of hardware-implemented machines including, as illustrated, a set of hosts 112, set of targets 180, data stores, and/or other hardware resources. In embodiments, managed network 116 can likewise include an installed or instantiated set of virtual machines 166, in addition to hardware-implemented machines.

In embodiments as shown, set of virtual machines 166 can comprise a set of virtual machines instantiated under the supervision of a virtual machine operating platform 162, such as a hypervisor or virtualized operating system or platform. In embodiments, virtual machine operating platform 162 can be hosted in and/or run by a mainframe platform 160. In embodiments, mainframe platform 160 can comprise a processor, memory, storage, and/or other resources installed on a comparatively large scale, such as the System z10™ or other mainframe platforms available from IBM Corp. or other vendors.

In embodiments, virtual machine operating platform 162 can operate to build, configure, and instantiate the set of virtual machines 166 from the resources of mainframe platform 160. In embodiments, the set of virtual machines 166 can be virtualized from the hardware resources of mainframe platform 160. According to various embodiments, resources of mainframe platform 160 used to support set of virtual machines 166 can be allocated to partitions on a one-to-one mapping with the underlying physical hardware, without sharing resources among partitions. According to embodiments, those hardware resources can be managed by software, firmware, and/or other logic such as virtual machine operating platform 162. In embodiments, the underlying hardware resources can be shared between partitions, if desired.

According to embodiments, resources of mainframe platform 160 can be managed by virtual machine operating platform 162 and/or other software or logical layers, combined into shared resource pools, and allocated to users of the set of virtual machines 166 as logical resources, separating the presentation of the resources from the supporting physical hardware. According to various embodiments, virtual machine operating platform 162 can include software and logic components including a hypervisor, or a set of software or logic that virtualizes the underlying hardware environment of mainframe platform 160. In embodiments, virtual machine operating platform 162 can comprise a virtual machine-only operating system, supporting an operating environment on each virtual machine in set of virtual machines 166. According to embodiments, the virtual machine or other guest systems in set of virtual machines 166 can access, instantiate, and operate with or on virtual components including processors, memory, storage, I/O devices, network connections, and/or other hardware, software, data, and/or other resources. According to embodiments, operating systems and associated applications can execute in the set of virtual machines 166 as if the virtual machine or other guest system was executing on underlying physical hardware or other resources. In embodiments, different virtual machines in set of virtual machines 166 can host or execute the same or different operating systems and/or software applications. In embodiments, set of virtual machines 166 can be generated from the processor, memory, and/or other resources of mainframe platform 160 based on a time-shared or time-sliced basis, so that users of individual virtual machines populating the set of virtual machines 166 can access or receive all or some portion of the resources of mainframe platform 160 every predetermined time period, such as a 1 millisecond interval, a 500 millisecond interval, or other greater or lesser, regular or irregular interval. It may be noted that while embodiments are illustrated in which a set of virtual machines 166 are instantiated and managed using a mainframe platform 160, in embodiments, virtual machines can in addition or instead be instantiated and/or accessed via a cloud computing environment, such as those described in co-pending application U.S. Ser. No. 12/128,768 filed May 29, 2008, entitled "Systems and Methods for Identification and Management of Cloud-Based Virtual Machines," assigned or under obligation of assignment to the same entity as the present application, which application is incorporated by reference herein.

In embodiments, in terms of acquisition of set of virtual machines 166 into managed network 116, network management platform 102 can host or access a pre-boot management tool 170 that acts to register, monitor, and track the constituent machines and services in managed network 116 during a pre-boot phase of operations of those machines. In embodiments, pre-boot management tool 170 can be or include a PXE-based or PXE-compatible application, logic, or other resources that operate to interrogate the complete complement of both hardware-implemented and virtual machines installed in managed network 116. In embodiments, hardware-implemented machines such as, for example, set of hosts 112, set of targets 180, and/or other hardware-implemented resources such as other services, clients, databases, or other devices can be interrogated by pre-boot management tool 170 during a start-up, pre-boot, or other initiation phase of operation. In embodiments, as noted pre-boot management tool 170 can detect the initial connection or power-on of a hardware-implemented machine to managed network 116. In embodiments, that initial connection or power-on can be detected via the detection of a media access control (MAC) address encoded in a local area network (LAN) card, or other identifier and/or other device or connection. In embodiments, the attachment or power-on of a hardware address or other hardware-based identifier can be detected pre-boot management tool 170, and used to initiate pre-boot processing of that device or devices. In embodiments, pre-boot management tool 170 can communicate with detected hardware devices to issue a set of pre-boot commands 168 to that device or devices. Set of pre-boot commands 168 can include commands and/or other data to control the operation of the subject device prior to loading an operating system or other software. Set of pre-boot commands 168 can include commands and/or other data to, for example, configure network connections, services, and/or software of the subject machine or device, authenticate or validate the use or operation of the subject machine or device, or perform other operations. According to embodiments, pre-boot management tool 170 can cause the subject machine or device to boot into an installed or native operating system of the device, once pre-boot operations are completed.

In embodiments, managed network 116 can likewise manage set of virtual machines 166 during pre-boot operations, despite the absence of hardware MAC addresses or other hardware-based identifiers. According to embodiments, pre-boot management tool 170 can interact with pre-boot translation engine 164 to communicate with mainframe platform 160 and/or virtual machine platform 162 to access, identify, and control pre-boot or pre-instantiation operations of set of virtual machines 166. In embodiments, pre-boot translation engine 164 can be hosted in mainframe platform 160, as shown. In embodiments, pre-boot translation engine 164 can be hosted in other locations or resources, including, for instance, network management platform 102. According to embodiments, pre-boot translation engine 164 can be configured in or with, or support execution of scripts in a language such as ReXX™ (Restructured Extended Executor) supported by IBM Corp., or other languages or protocols. In embodiments, pre-boot translation engine 164 can pass data including set of pre-boot commands 168 back and forth between pre-boot management tool 170 and set of virtual machines 166 via mainframe platform 160 and/or virtual machine platforms 162. In embodiments, pre-boot management tool 170 can thereby detect, configure and manage set of virtual machines 166 to control the pre-boot and subsequent operations of those resources, without a requirement for hardware identifiers and/or other hardware attributes.

As likewise shown in FIG. 1, according to embodiments in further regards, network management platform 102 can likewise host a power management engine 182 to communicate with managed network 116 and, in general, conduct power management operations on the hardware-installed or hardware-implemented resources of the network, as well as set of virtual machines 166 and/or other virtual resources of the network. In embodiments as shown, power management engine 182 can communicate a set of power management commands 188 to managed network and its constituent nodes and resources to carry out power management operations. Set of power management commands 188 can include commands, instructions, scripts, code, and/or other data to perform operations, for instance, to turn individual machines or devices on or off, or to reduce or restore power levels in individual machines or devices, for example to place a machine or device into a "sleep" mode, or recover from that mode.

In embodiments, set of power management commands 188 can contain other commands and/or data, for instance, to sequence the starting and stopping of individual machines required for certain operations, for example, to boot a server machine down before employing that machine for other purposes, or shutting down virtual machines running on a subject host to permit redeployment of that host for other purposes. For those and other purposes, it may be noted that power management engine 182 can be configured to control both the hardware-implemented machines of managed network 116, such as set of hosts 112 and set of targets 180, as well as regulate the power cycling operations of usage of set of virtual machines 166. In embodiments, set of power management commands 188 can contain instructions to sequence the power-on, power-off, and/or other power cycling operations between set of virtual machines 166 and hardware-based machines or resources, as necessary. Other power usage management and balancing operations can be conducted.

Figure 2:
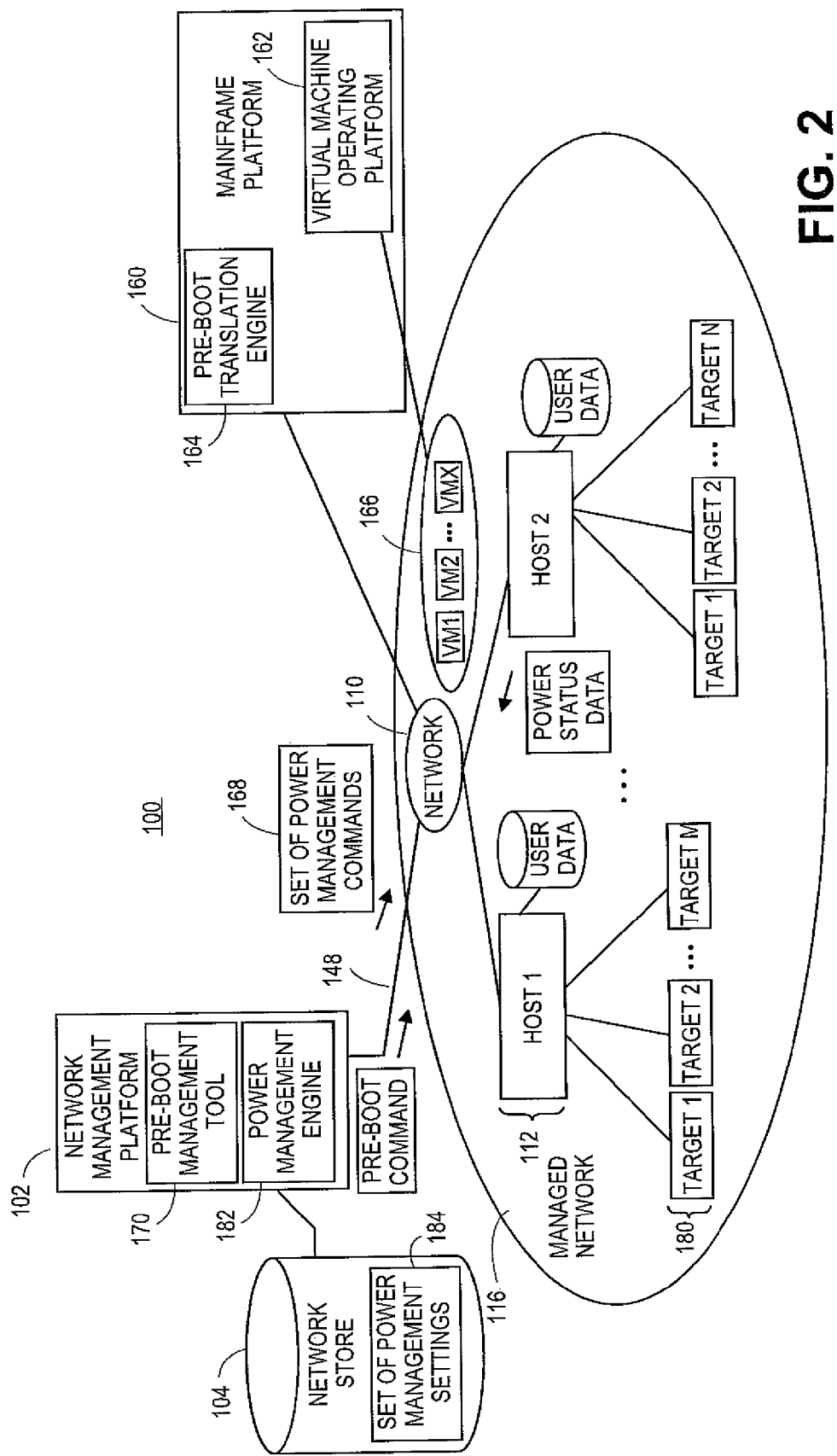
FIG. 2 illustrates an overall network in which systems and methods for power management in a managed network having hardware-based and virtual resources can be implemented, in various further regards.

As, for, example more particularly shown in FIG. 2, in embodiments, pre-boot management tool 170 can interrogate set of hosts 112, set of targets 180, and/or other servers, hosts, clients, targets, and/or other machines implemented or realized as separate hardware entities in managed network 116, to initiate a pre-boot configuration and/or management process. In embodiments, the hardware hosts, targets, and/or other entities can be identified via hardware identifiers such as media access control (MAC) addresses encoded in a local area network (LAN) card, an Internet protocol (IP) address, or other network device or connection. In embodiments, machines discovered by way of MAC addresses and/or other identifiers can be controlled via the transmission of a set of pre-boot commands 168, such as PXE-based or PXE-compatible commands or data.

According to embodiments in one regard, and as also shown in FIG. 2, power management engine 182 can communicate with managed network 116 to collect power status data, transmit power management commands, and perform other power management operations. In embodiments as shown, power management engine 182 can collect power status data 186 from any one or more machine, device, and/or resource of managed network, including both hardware-installed and virtual machines. In the case of hardware-installed machines, such as set of hosts 112 and set of targets 180, power status data 186 collected from those devices can comprise power-on, power-off, power cycling or staging, or other power status (e.g., sleep mode) reports generated via individual machines, for instance via their operating systems. In the case of set of virtual machines 166, power status data 186 collected from those devices can comprise a power status or usage allocation generated by virtual machine operating platform 162.

In various embodiments, power management engine 182 can for instance access a power management settings 184, to determine operating parameters and policies for the power sequencing of managed network 116 power management settings 184 can comprise fields and other data governing the power usage parameters of managed network 116 and its constituent nodes and other parts. In embodiments, power management settings 184 can specify, for instance, that one or more identified machines or services be shut down or idled before applying power to another set of machines. For further instance, power management settings 184 can specify that set of hosts 112, set of targets 180, and/or other hardware-implemented devices be powered down after 6:00 pm in the evening. Other power management schedules, sequences, criteria or or logic can be built into power management settings 184.

In embodiments, as noted, power management engine 182 can transmit one of more power management commands 188 in response to or based on power status data 186, power management settings 184, and/or other information associated with the power usage of managed network 116. In embodiments, power management commands 188 can be communicated directly to hardware-implemented resources, such as set of hosts 112, set of targets 180, associated storage, and/or other hardware. In embodiments, power management commands 188 can also be communicated to virtual operating platform 162 to implement power management policies reflected in power management settings 184 in set of virtual machines 166. Because in one regard power management engine 182 can access and control both hardware-based and virtual machines and resources of managed network 116, power management can be effectively integrated on a network-wide basis.

It may be noted that while power management engine 182 is illustrated as a separate module hosted in network management 102, in embodiments, power management engine 182 can be hosted or located in other resources, or be combined with other logic or resources, including, for instance, pre-boot management tool 170 or other resources. Further, it may be noted that while embodiments are here illustrated and described in which a virtual operating platform 162 can be leveraged to access virtual machines and managing overall power operations, in embodiments, different virtual platforms and management configurations can be used.

As also shown in FIG. 2, in terms of incorporating set of virtual machines 166 into managed network 116 for power management and other operations, network management platform 102 can operate to connect to a given one or more virtual machine hosted in set of virtual machines 166, to conduct pre-boot configuration and other control of those entities. According to embodiments as shown, pre-boot management tool 170 can communicate with pre-boot translation engine 164 to exchange set of pre-boot commands 168 and other data, to conduct those operations. In embodiments as shown, pre-boot translation engine 164 can generate and transmit a set of pseudo-MAC addresses 172 to pre-boot management tool 170, to identify newly instantiated or installed virtual machines in set of virtual machines 166. In embodiments, pre-boot management tool 170 can receive set of pseudo-MAC addresses 172 to identify connected virtual machines, to initiate and control pre-boot and subsequent operations. After the identified virtual machines have been registered via set of pseudo-MAC addresses or other temporary or virtual hardware identifiers, pre-boot management tool 170 can interrogate and configure set of virtual machines 166 in manners similar to set of hosts 112, set of targets 180, and/or other hardware-implemented machines. In embodiments, for example, pre-boot management tool 170 can configure the installation of defined applications or other software in the subject virtual machine or machines. In embodiments, network configurations can be controlled during a pre-boot, per-instantiation, or other stage of operation of set of virtual machines 166. Other network control operations on set of virtual machines 166 can be carried out. It may further be noted that while FIGS. 1 and 2 illustrate network implementations involving power management via virtual operating platform 162 of a mainframe platform 160, in addition to or instead of employing a virtual operating platform 162 to coordinate a set of virtual machines 166, in embodiments, other virtualization resources or platforms can be used. For instance, in embodiments, resources such as the "libvirt" API (application programming interface) running under Linux™ operating systems can be used to interface to various other virtualization platforms, such as Xen™ or KVM™ virtualization platforms, to instantiate and managed a set of virtual machines 166 and their power consumption profile. Implementations of the present teachings employing virtual resources accessed via libvirt or other APIs or resources can likewise interact and manage both physical machines and virtual machines to manage aggregate power usage, according to various implementations.

Figure 3:
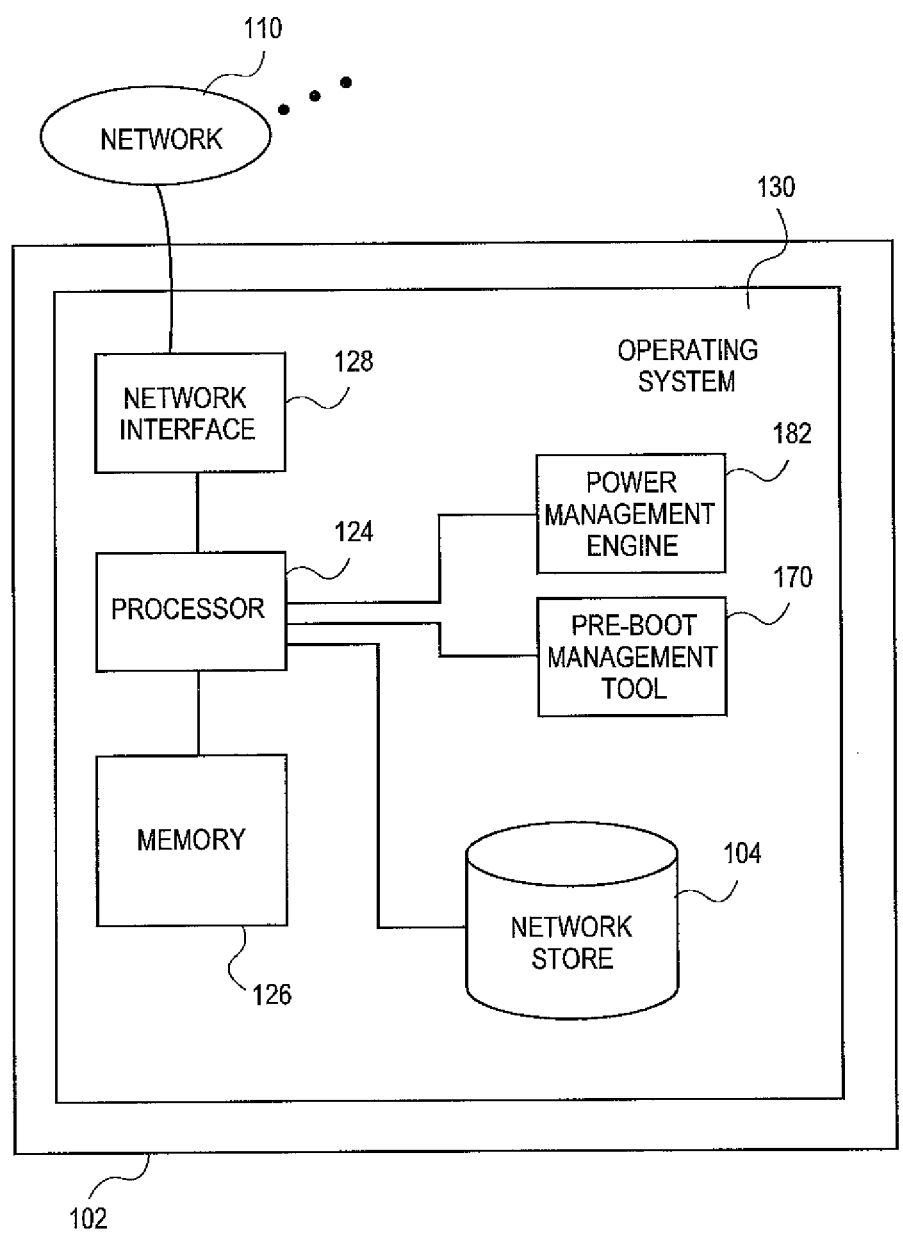
FIG. 3 depicts an illustrative hardware configuration which can support systems and methods for power management in a managed network having hardware-based and virtual resources, according to various embodiments of the present teachings.

FIG. 3 illustrates an exemplary diagram of hardware and other resources that can be incorporated in a network management platform 102 configured to communicate with managed network 116 including set of virtual machines 166 and/or other resources, according to embodiments. In embodiments as shown, the network management platform 102 can comprise a processor 124 communicating with memory 126, such as electronic random access memory, operating under control of or in conjunction with operating system 130. Operating system 130 can be, for example, a distribution of the Linux™ operating system, the Unix™ operating system, or other open-source or proprietary operating system or platform. Processor 124 also communicates with a network store 104, such as a database stored on a local hard drive. Processor 124 further communicates with network interface 128, such as an Ethernet or wireless data connection, which in turn communicates with one or more networks 110, such as the Internet or other public or private networks. Processor 124 also communicates with power management engine 182 and pre-boot management tool 170 and/or other resources or logic, to execute control and perform power control, pre-boot, and other management processes described herein. Other configurations of the network management platform 102, associated network connections, and other hardware and software resources are possible. While FIG. 3 illustrates network management platform 102 as a standalone system comprises a combination of hardware and software, network management platform 102 can also be implemented as a software application or program capable of being executed by a conventional computer platform. Likewise, network management platform 102 can also be implemented as a software module or program module capable of being incorporated in other software applications and programs. In either case, network management platform 102 can be implemented in any type of conventional proprietary or open-source computer language.

Figure 4:
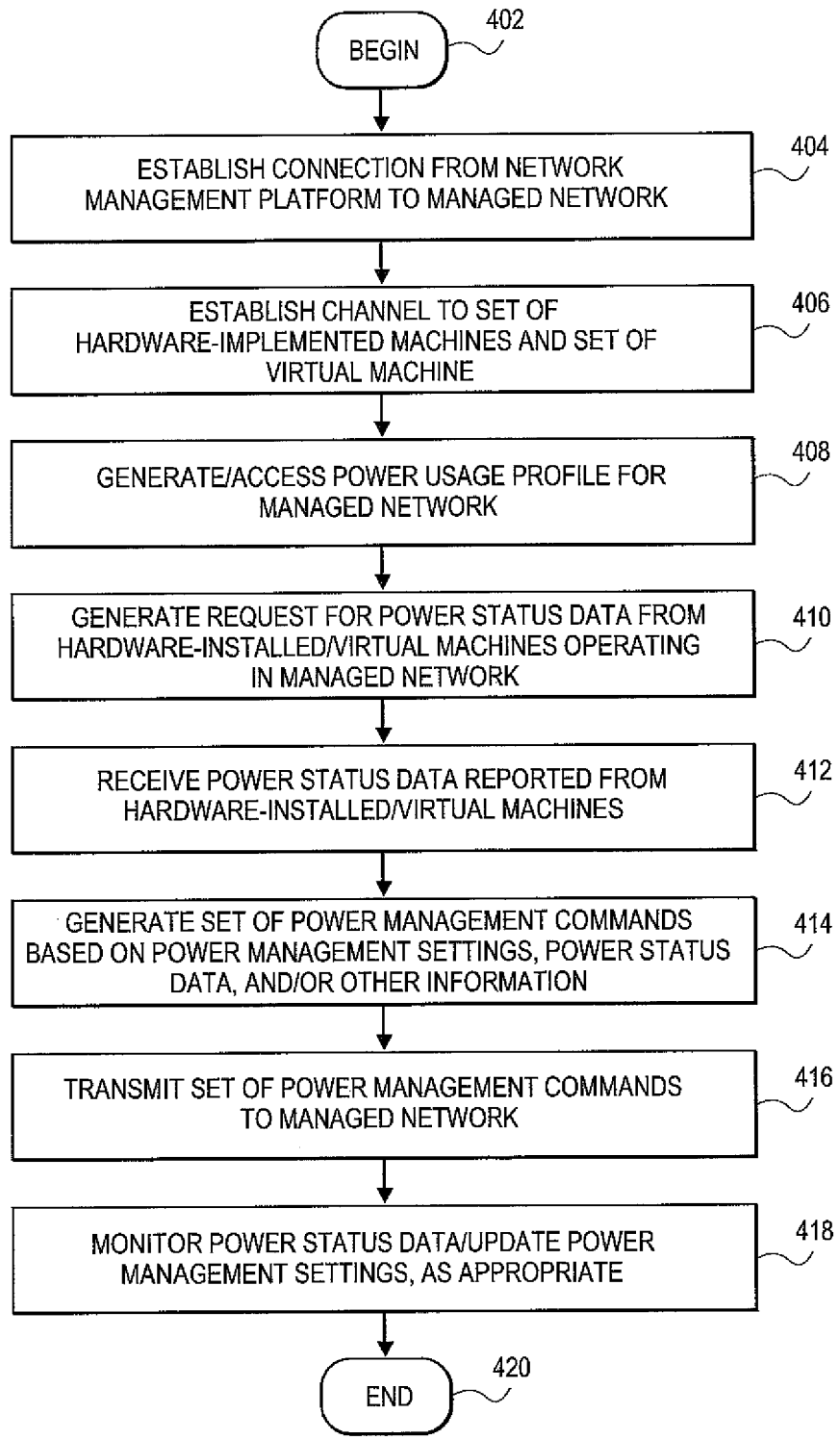
FIG. 4 illustrates a flowchart of power management processing in a managed network having hardware-based and virtual resources, according to various embodiments of the present teachings.

FIG. 4 illustrates a flowchart of power management processing in a network having hardware-installed and virtual resources, according to various embodiments. In 402, processing can begin. In 404, a connection can be established between network management platform 102 and managed network 116, for instance using secure channel 148 and/or other channels or connections. In 406, a channel or connection can be established to one or more hardware-installed or hardware-implemented machines, as well as set of virtual machines 166 in managed network 116. In 408, power management settings 184 can be generated and/or accessed via power management engine 182 of network management platform 102, or other logic or resources. In 410, power management engine 182 can generate a request for power status data 186 from hardware-installed and/or set of virtual machines 166. In 412, power management engine 182 can receive power status data 186 from the hardware-installed and/or set of virtual machines 166 in managed network 116, indicating, for example, power-on, power-off, power cycling (e.g. sleep mode, hibernate mode) or other states of individual machines, and/or other data. In 414, the power management engine 182 can generate a set of power management commands 188 to transmit to managed network 116, to control operation of the hardware and/or virtual resources in the network. For instance, set of power management commands 188 can set a power-up or power-down sequence of hardware-based and/or virtual machines, based for example on dependency orders for those machines or resources. In 416, power management engine 182 can transmit set of power management commands 188 to one or more hardware-based and/or virtual machines in managed network 116. In embodiments, set of power management commands 188 can take the form of scripts, or other code or logic. In 418, power status data 186 can be further monitored and/or power management settings 184 can be updated, as appropriate. In 420, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which power management engine 182 is hosted in network management platform 102, in embodiments, power management logic can be hosted in one or multiple other local or remote locations or resources, such as local or remote servers. For further example, while embodiments have been described in which hardware-implemented machines are identified via a MAC address on a LAN card and set of virtual machines 166 are identified via a pseudo or temporary version of the same address, in embodiments, other types of address or identifiers for both hardware and virtual machines can be used. For further example, while embodiments have been described in which managed network 116 incorporates one set of virtual machines 116 which are instantiated via one mainframe platform 160, in embodiments, managed network 116 can incorporate more than one set of virtual machines. In embodiments, one mainframe platform can instantiate and manage more than one set of virtual machines. In embodiments, multiple mainframe computers or platforms can each instantiate and manage separate sets of virtual machines. In embodiments, in addition to or instead of mainframe-based virtual machines, one or more sets of virtual machines instantiated in or from a cloud computing environment can be incorporated in managed network 116. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
   receiving a set of media access control (MAC) addresses and a set of pseudo-MAC addresses during pre-boot operations of a plurality of machines;
   discovering, by a processor, a set of hardware-implemented machines in view of the set of MAC addresses and a set of virtual machines in view of the set of pseudo-MAC addresses;
   generating, by the processor, a power management schedule for the set of hardware-implemented machines and the set of virtual machines in view of a dependency ordering of two or more machines, each of the two or more machines being a member of one of: the set of hardware-implemented machines or the set of virtual machines; and
   issuing a set of power management commands in accordance with the power management schedule to adjust the power usage of the two or more machines.

2. The method of claim 1, wherein the power management schedule is generated in view of power status data.

3. The method of claim 2, wherein the power status data comprises at least one of a power-on status, a power-off status, or a power cycling status for the set of virtual machines or the set of hardware-implemented machines.

4. The method of claim 1, wherein at least one virtual machine in the set of virtual machines comprises an image of at least one machine in the set of hardware-implemented machines.

5. The method of claim 1, wherein the set of virtual machines comprises at least one of a set of virtual machines hosted via a mainframe platform or a set of virtual machines instantiated in a cloud computing environment.

6. An apparatus comprising:
   a memory comprising instructions; and
   a processor operatively coupled to the memory, wherein the instructions cause the processor to:
      receive a set of media access control (MAC) addresses and a set of pseudo-MAC addresses during pre-boot operations of a plurality of machines;
      discover, by the processor, a set of hardware-implemented machines in view of the set of MAC addresses and a set of virtual machines in view of the set of pseudo-MAC addresses;
      generate, by the processor, a power management schedule for the set of hardware-implemented machines and the set of virtual machines in view of a dependency ordering of two or more machines, each of the two or more machines being a member of one of: a set of hardware-implemented machines or a set of virtual machines; and
   issue a set of power management commands in accordance with the power management schedule to adjust the power usage of the two or more machines.

7. The apparatus of claim 6, wherein the power management schedule is generated in view of power status data.

8. The apparatus of claim 7, wherein the power status data comprises at least one of a power-on status, a power-off status, or a power cycling status for the set of virtual machines or the set of hardware-implemented machines.

9. The apparatus of claim 6, wherein at least one virtual machine in the set of virtual machines comprises an image of at least one machine in the set of hardware-implemented machines.

10. The apparatus of claim 6, wherein the set of virtual machines comprises at least one of a set of virtual machines hosted via a mainframe platform or a set of virtual machines instantiated in a cloud computing environment.

11. A system comprising:
    a memory comprising instructions; and
    a processor operatively coupled to the memory, wherein the instructions cause the processor to:
       receive a set of media access control (MAC) addresses and a set of pseudo MAC addresses during pre-boot operations of a plurality of machines;
       discover, by the processor, a set of hardware-implemented machines in view of the set of MAC addresses and a set of virtual machines in view of the set of pseudo-MAC addresses;
       generate, by the processor, power management schedule for the set of hardware-implemented machines and the set of virtual machines in view of a dependency ordering of two or more machines, each machine a member of one of: the set of hardware-implemented machines or the set of virtual machines; and
       issue a set of power management commands in accordance with the power management schedule to adjust the power usage of the two or more machines, wherein to adjust the power usage comprises placing the two or more machines into a sleep mode.

12. The system of claim 11, wherein the power management schedule is generated in view of power status data.

13. The system of claim 12, wherein the power status data comprises a power-on status, a power-off status, or a power cycling status for the set of virtual machines and the set of hardware-implemented machines.

14. The system of claim 11, wherein at least one virtual machine in the set of virtual machines comprises an image of at least one machine in the set of hardware-implemented machines.

15. The system of claim 11, wherein the set of virtual machines comprises at least one of a set of virtual machines hosted via a mainframe platform or a set of virtual machines instantiated in a cloud computing environment.

* * * * *